United States Patent [19]

Kozlowski

[11] Patent Number: 5,197,510

[45] Date of Patent: Mar. 30, 1993

[54] APPARATUS FOR CHECKING BACK PRESSURE

[75] Inventor: Leo J. Kozlowski, Napa, Calif.

[73] Assignee: Nsertaseal Corporation, Richmond, Calif.

[21] Appl. No.: 913,623

[22] Filed: Jul. 16, 1992

[51] Int. Cl.⁵ .................. F16K 24/00; F16K 37/00
[52] U.S. Cl. ...................... 137/216.2; 137/247.15; 137/559; 137/362; 404/25
[58] Field of Search ................. 137/216.1, 216.2, 217, 137/559, 247.15, 356, 362; 404/25; 210/164

[56] References Cited

U.S. PATENT DOCUMENTS

| 477,499 | 6/1892 | Brown | 137/559 X |
|---|---|---|---|
| 961,343 | 6/1910 | Evans | 137/559 X |
| 1,423,135 | 7/1922 | Miller | 137/559 X |
| 2,800,139 | 7/1957 | Langdon | 137/216.2 |
| 3,516,541 | 6/1970 | Hardingham | 210/164 |
| 3,556,993 | 1/1971 | Persson | 210/164 |
| 4,545,398 | 10/1985 | van Olst | 137/216.2 |
| 4,682,907 | 7/1987 | Gaudin | 404/25 |
| 4,776,722 | 10/1988 | Gaudin | 404/25 |

FOREIGN PATENT DOCUMENTS

| 760800 | 3/1934 | France | 137/216.2 |
|---|---|---|---|
| 2041422 | 9/1980 | United Kingdom | 137/216.2 |

*Primary Examiner*—John Rivell
*Attorney, Agent, or Firm*—Thomas R. Lampe

[57] ABSTRACT

Apparatus for monitoring gas pressure in a drain line including a housing, a liquid trap within the housing interior, a liquid collector for collecting liquid displaced from the trap when gas pressure in the drain line exceeds a predetermined level, and a valve for introducing air into the housing when a negative gas pressure exists in the drain line.

14 Claims, 2 Drawing Sheets

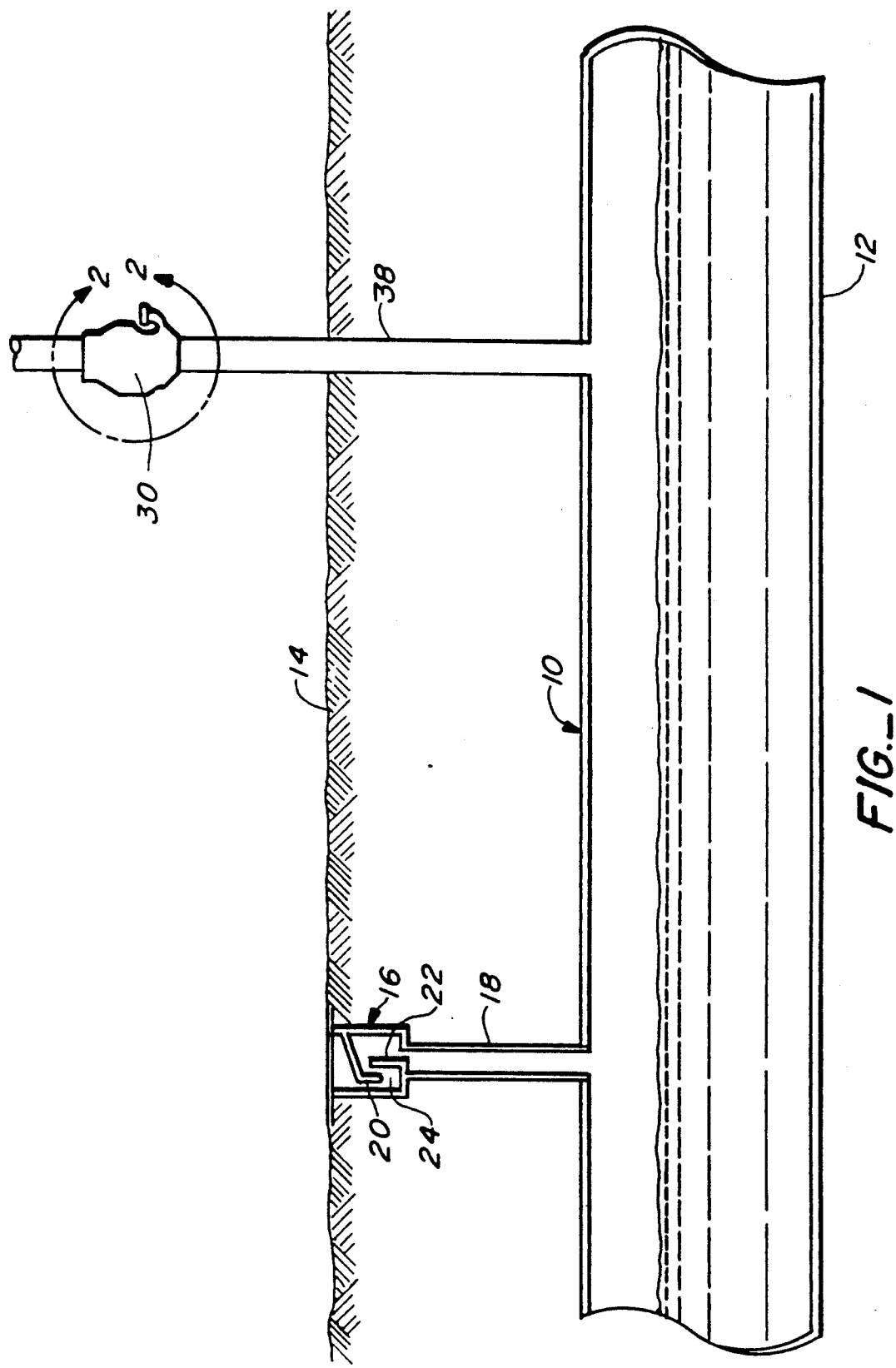
FIG._1

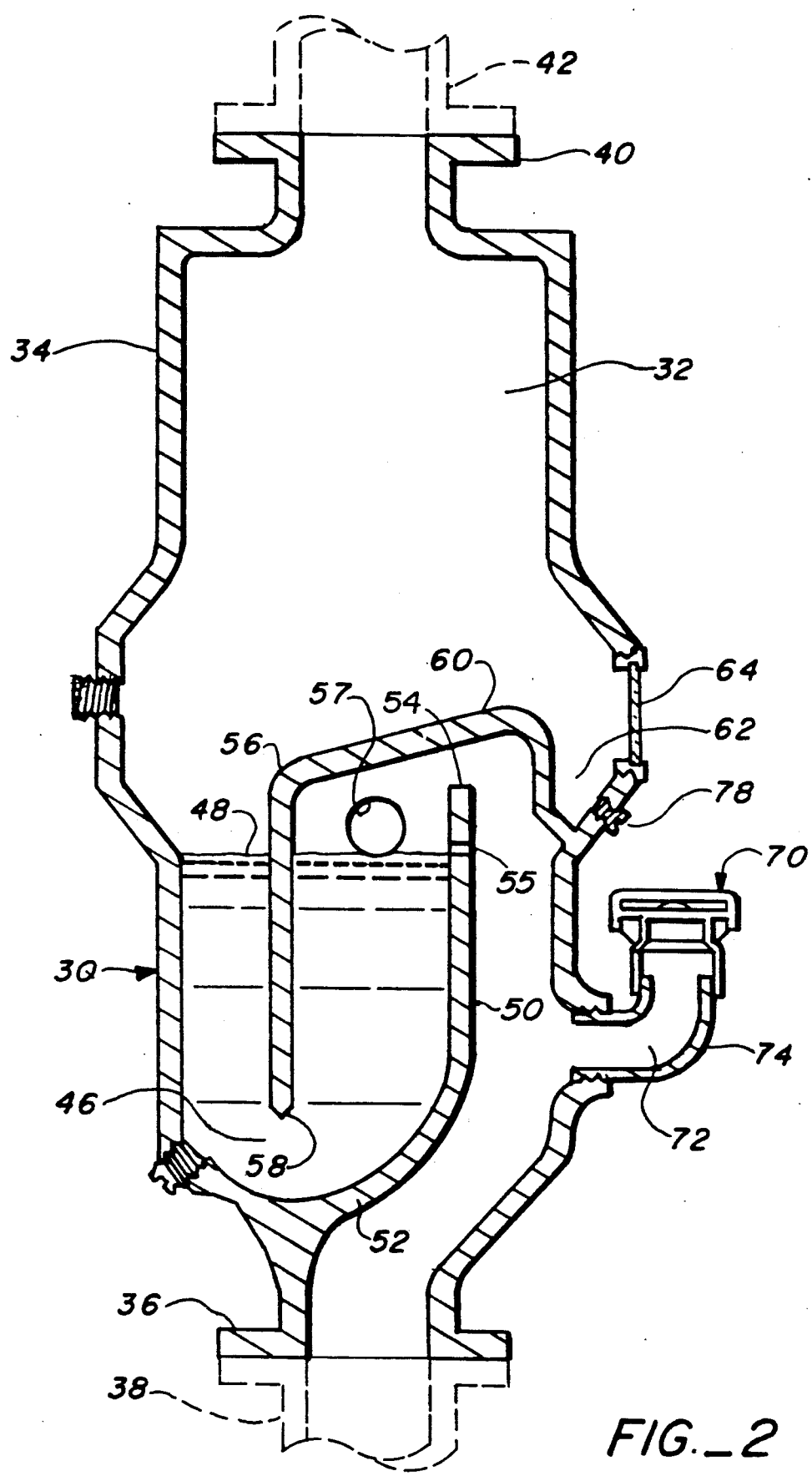
FIG._2

APPARATUS FOR CHECKING BACK PRESSURE

TECHNICAL FIELD

This invention relates to apparatus for checking back pressure. More particularly, the apparatus is for use in a drain system including a drain line to monitor gas pressure in the drain line.

BACKGROUND ART

It is well known to provide underground drain lines at refineries and other industrial installations for disposing of surface water and possibly other liquids to remote locations where appropriate treatment and disposal takes place. It is also known to provide devices which allow for drainage of a liquid from a surface into a drain line or sewer while at the same time forming a liquid barrier to deter against the release or escape of gases from the sewer. An example of such a device is a drain apparatus with liquid trap which is the subject of co-pending, commonly assigned U.S. patent application Ser. No. 07/706,322, filed on May 28, 1991. Other devices are disclosed in U.S. Pat. No. 4,682,907, issued Jul. 28, 1987, U.S. Pat. No. 4,776,722, issued Oct. 11, 1988, U.S. Pat. No. 3,516,541, issued Jun. 23, 1970, and U.S. Pat. No. 3,556,993, issued Jan. 19, 1971.

The various forms of drain devices incorporating liquid traps are, of course, not absolute barriers to the emission of gases from the sewers or drain lines with which they are associated. That is, a gas pressure of sufficient magnitude in the line will cause displacement of water or other liquid in the traps and result in the venting of gases therethrough into the ambient atmosphere. This can result in the release of noxious and even dangerous vapors and gases.

DISCLOSURE OF INVENTION

The apparatus of the present invention is for use in a drain system including a drain line and for monitoring gas pressure in the drain line. When the apparatus is employed in an operational environment wherein the drain system includes a drain device having a water trap in operative association with the drain line, the apparatus provides a means whereby an individual can detect the presence of pressurized gas in the drain line prior to venting of the pressurized gas through the drain device. That is, potential problems involving pressurized gas in a drain line or sewer may be readily detected and dealt with before noxious or harmful gases exit drains incorporated in the system.

The apparatus includes housing means defining an interior for communication with the drain line. Liquid trap means is disposed within the housing means interior and defines a trap sump for retaining liquid therein to impede the flow of gas in the housing means interior.

Liquid collector means is in operative association with the liquid trap means and defines a space separated from the trap sump for collecting liquid displaced from the trap sump when gas in the drain line exceeds a predetermined pressure.

Valve means allows passage of air from the ambient atmosphere into the drain line when a negative gas pressure exists in the drain line. The valve means is a one-way valve which does not allow venting of pressurized gases from the drain line to pass therethrough into the ambient atmosphere.

The trap sump is defined by an inner wall and an outer wall and includes a bottom between the inner and outer walls. The inner wall is spaced from the outer wall and has a distal end spaced upwardly from the trap sump bottom. The liquid trap means further includes a divider having a lower distal end. The divider extends downwardly between the inner and outer walls. The lower distal end of the divider is spaced above the bottom and submergible in liquid disposed in the trap sump.

The drain system includes at least one drain device having a water trap connected to the drain line at a location spaced from the housing means. Gas pressure in the drain line displaces liquid from the liquid trap means at a lower gas pressure then that required to displace liquid from the water trap of the drain device.

Other features, advantages, and objects of the present invention will become apparent with reference to the following description and accompanying drawings.

BRIEF DESCRIPTION OF DRAWINGS

FIG. 1 is a diagrammatic presentation of a representative drain system incorporating apparatus constructed in accordance with the teachings of the present invention; and FIG. 2 is a greatly enlarged, cross-sectional, elevational view of apparatus constructed in accordance with the teachings of the present invention and encompassed by the line 2—2 in FIG. 1.

BEST MODE FOR CARRYING OUT THE INVENTION

Referring now to the drawings, a drain line or sewer line 10 is illustrated. The main conduit 12 of the line is positioned below the surface 14 of the earth.

A drain device 16, which may, for example, be of the type disclosed in afore-mentioned pending U.S. application Ser. No. 07/706,322, filed May 28, 1991, is connected to main conduit 12 by branch conduit 18. Drain device 16 will not be described in detail, however, it is to be understood that the device outer wall and divider walls 20, 22 define a generally S-shaped passageway for liquid draining in the device from surface 14 as well as a trap 24 to form a seal between the drain line and ambient atmosphere.

The purpose of the present invention is to monitor gas pressure in the drain line and determine when positive gas pressure conditions exist therein before water or other liquid in the trap of device 1 (or other type of prior art device incorporating a liquid trap) is displaced and line gases vented to the atmosphere.

The apparatus includes a housing 30 defining an interior 32 for communication with the drain line. More specifically, the outer wall 34 of the disclosed housing has a flange 36 at the lower end thereof which is connected by suitable mechanical fasteners (not shown) to the upper end of a branch conduit 38 leading to the drain line main conduit 12.

The outer wall 34 of the housing 30 is of generally cylindrical shape and also is flanged at its upper end, as designated by reference numeral 40, so that it can be connected to a pipe 42 which delivers any gases vented through the housing to a predetermined location for treatment and/or disposal. The housing may be formed of any suitable material such as cast metal.

The apparatus includes a liquid trap within the housing interior defining a trap sump 46 for retaining water or other suitable liquid therein to impede the flow of gas in the interior of the housing. The liquid is designated by reference numeral 48.

The trap sump is defined by outer wall 34 and inner wall 50 and includes a curved bottom 52 between the inner and outer walls.

Inner wall 50 is spaced from outer wall 34 and has a distal end 54 spaced upwardly from the trap sump bottom. A small drain hole 55 is formed in inner wall 50 through which liquid drains. The height of the drain hole 5 eventually determines the maximum liquid capacity of the trap sump since excess liquid will drain therethrough and proceed to main conduit 12 through branch conduit 38. Of course, a flow of liquid through the trap exceeding the capacity of the drain hole will flow over distal end 34 of inner wall 50. A sight glass 57 is located at the level of drain hole 55.

A divider wall 56 projects downwardly into the trap sump and has a distal end 58 submerged in the water or other liquid disposed in the trap sump. Divider wall 56 is integral with an auxiliary wall 60 which extends generally horizontally away from divider wall 56 and then bends downwardly into engagement with outer wall 34 to define a space or pocket 62 therewith.

When a gas pressure of a predetermined magnitude exists within the drain line, such gas pressure will cause the liquid in trap sump 46 to be displaced. This will result in some of the liquid moving up within the passageway defined by outer wall 34 and divider wall 56 above the level of slanted auxiliary wall 60. The displaced liquid attaining such level will flow along the upper surface of auxiliary wall 60 and thence into space 62. The slant of auxiliary wall 60 is important since flow of displaced liquid to the space 62 may be carefully controlled. This is due to the fact that a relatively large volume of liquid may be displaced u the slanted auxiliary wall without significantly increasing head pressure of the upwardly displaced liquid.

An eye glass 64 is located in the housing so that an individual outside the housing can observe when liquid has been displaced into space 62. When liquid is observed in space 62, the observer will know that a positive pressure of a predetermined degree has existed within the drain system so that appropriate action can be taken to remedy the situation.

The liquid collector means just described is so dimensioned as to provide for displacement of liquid to the space or pocket 62 as a result of gas pressure lower than that required to displace liquid from the water trap of drain device 16. That is, the operator will be alerted to gas pressure within the drain line before water or other liquid in trap 24 of drain device 16 is displaced and potentially dangerous gases vented to the atmosphere through the drain device. If desired, a signalling device (not shown) of any suitable type may be employed in association with the liquid collector means to signal when liquid is displaced to the space 62 A plug 78 is threadedly engaged to the housing to permit ready draining of liquid from pocket 62 as and when desired.

An important feature of the present invention resides in the fact that the apparatus incorporates a one-way valve 70 for allowing passage of air from the ambient atmosphere into the drain line when a negative gas pressure exists in the drain line. Placement of the valve 70 is important. It is located between the drain line and the trap sump 46 whereby negative gas pressure in the drain line will not apply a vacuum to liquid in the trap sump and inadvertently empty same by drawing the liquid into the drain line through the S-shaped passageway defined by outer wall 34, inner wall 50, and auxiliary wall 60. In the arrangement shown, outer wall 30 defines an air inlet 72 opposite inner wall 50. An elbow 74, to which valve 70 is connected, is threadedly engaged to the housing at the air inlet. The one-way valve 70 may be of any suitable type.

It has been found that initial application of a vacuum within the drain system may cause negative pressure to exist at the top of the liquid within the trap between inner wall 50 and divider wall 56 for a brief moment before the valve 70 opens, causing some slight displacement of the liquid in the trap. The fact that the distal end 54 of inner wall 50 is positioned above drain hole 55 prevents such displacement from causing liquid flow over the distal end.

I claim:

1. Apparatus for use in a drain system including a drain line and for monitoring gas pressure in said drain line, said apparatus comprising, in combination:

housing means defining an interior for communication with said drain line;

liquid trap means within said housing means interior defining a trap sump for retaining liquid therein to impede the flow of gas in the said housing means interior;

liquid collector means in operative association with said liquid trap means and defining a space separated from said trap sump for collecting liquid displaced from said trap sump when gas in said drain line exceeds a predetermined pressure; and valve means for allowing passage of air from the ambient atmosphere into said drain line when a negative gas pressure exists in said drain line.

2. The apparatus according to claim 1 wherein said trap sump is defined by an inner wall and an outer wall and includes a bottom between said inner and outer walls, said inner wall being spaced from said outer wall and having a distal end spaced upwardly from said trap sump bottom, said liquid trap means further including a divider having a lower distal end, said divider extending downwardly between said inner and outer walls and the lower distal end of said divider spaced above said bottom and submergible in liquid disposed in said trap sump.

3. The apparatus according to claim 1 wherein said valve means comprises a one-way valve for preventing the venting of pressurized gas therethrough into the ambient atmosphere, said housing means defining an air inlet providing communication between said one-way valve and said housing interior at a location between said drain line and said trap sump.

4. The apparatus according to claim 1 wherein said housing defines a sight hole allowing observation of said liquid collector means from a location external of said housing.

5. The apparatus according to claim 1 wherein s id apparatus additionally comprises means for selectively draining said liquid from said liquid collector means space.

6. The apparatus according to claim 2 wherein said divider includes a generally vertical divider wall extending upwardly from said divider lower distal end and an auxiliary wall interconnecting said divider wall to said housing, said auxiliary wall positioned above said inner wall distal end, said outer wall, said inner wall, and said auxiliary wall defining a generally S-shaped fluid flow path within said housing.

7. The apparatus according to claim 6 wherein said liquid collector means space is defined by said outer wall and said auxiliary wall.

8. The apparatus according to claim 7 wherein at least a portion of said liquid collector means space is located at a level higher than said inner wall distal end, said auxiliary wall at least partially defining a flow path for liquid displaced from said trap sump to said liquid collector means space.

9. The apparatus according to claim 2 wherein said outer wall defines an air inlet providing communication between said valve means and said housing means interior at a location generally opposed to said inner wall.

10. The apparatus according to claim 1 wherein said drain system additionally comprises at least one drain device having a water trap connected to said drain line at a location spaced from said housing means, gas pressure in said drain line being adapted to displace liquid from said liquid trap means at a lower gas pressure than that required to displace liquid from the water trap of said drain means.

11. The apparatus according to claim 1 wherein said valve means is positioned between said drain line and said liquid trap means whereby negative gas pressure in said drain line will not apply a vacuum to liquid in said trap sump.

12. The apparatus according to claim 8 wherein said auxiliary wall slants upwardly in the direction of said liquid collector means space.

13. The apparatus according to claim 2 wherein said inner wall defines a drain opening between said distal end and said trap sump bottom.

14. In combination:
a drain line;
apparatus for monitoring gas pressure in said drain line including housing means defining an interior in communication with said drain line, liquid trap means within said housing means interior defining a trap sump for retaining liquid therein to impede the flow of gas in the housing means interior, liquid collector means in operative association with said liquid trap means and defining a space separated from said trap sump for collecting liquid displaced from said trap sump when gas in said drain line exceeds a predetermined pressure, and valve means for allowing passage of air from the ambient atmosphere into said drain line when a negative gas pressure exists in said drain line; and
at least one drain device having a water trap connected to said drain line at a location spaced from said housing means, gas pressure in said drain line being adapted to displace liquid from said liquid trap means at a lower gas pressure than that required to displace liquid from the water trap of said drain device.

* * * * *